(12) United States Patent
Dean

(10) Patent No.: US 7,216,879 B2
(45) Date of Patent: May 15, 2007

(54) RECONFIGURABLE STRUT ASSEMBLY

(75) Inventor: Simon Dean, Waterford, MI (US)

(73) Assignee: Arvin Technologies, Inc., Troy, MI (US)

( * ) Notice: Subject to any disclaimer, the term of this patent is extended or adjusted under 35 U.S.C. 154(b) by 0 days.

(21) Appl. No.: 11/295,288

(22) Filed: Dec. 6, 2005

(65) Prior Publication Data

US 2006/0082092 A1  Apr. 20, 2006

Related U.S. Application Data

(62) Division of application No. 10/349,726, filed on Jan. 23, 2003, now Pat. No. 6,997,467.

(51) Int. Cl.
*B62D 7/18* (2006.01)

(52) U.S. Cl. .................................................. 280/93.512

(58) Field of Classification Search ........... 280/93.512, 280/93.511, 124.145, 124.146
See application file for complete search history.

(56) References Cited

U.S. PATENT DOCUMENTS

| | | | |
|---|---|---|---|
| 5,112,077 A | 5/1992 | Makita | |
| 5,257,801 A | 11/1993 | Matsuzawa et al. | |
| 5,538,274 A | 7/1996 | Schmitz et al. | |
| 5,782,484 A | 7/1998 | Kuhn, Jr. | |
| 5,836,599 A | 11/1998 | Rein de Vlugt | |
| 6,105,984 A | 8/2000 | Schmitz et al. | |
| 6,231,062 B1 * | 5/2001 | Sutton | 280/124.146 |
| 6,893,033 B2 * | 5/2005 | Dean et al. | 280/124.158 |

* cited by examiner

*Primary Examiner*—Faye M. Fleming
(74) *Attorney, Agent, or Firm*—Carlson, Gaskey & Olds, PC

(57) ABSTRACT

A vehicle includes front and rear suspension systems. The vehicle includes front left and right strut assemblies respectively including front left and right knuckles. Rear left and right strut assemblies respectively include rear left and right knuckles. The knuckles are common with one another with each knuckle having a common lower attachment boss. The front left and right knuckles respectively receive front left and right connection members at the lower attachment boss. The lower attachment boss is respectively interconnected to the front left and right suspension components. The rear left and right knuckles respectively receive rear left and right connection members at the lower attachment boss respectively interconnected to rear left and right suspension components. The overall suspension for the vehicle is designed by determining the left knuckle position parameters such as suspension member, brake, and wheel assembly attachment points. Similarly, the right knuckle position parameters are determined. Alternatively and/or additionally, front and rear knuckle portion parameters may be determined. Common vehicle attachment points on the knuckles are then calculated for the vehicle. Several iterations of the above design process may take place to commonize the suspension for a particular vehicle or across particular vehicle lines.

12 Claims, 1 Drawing Sheet

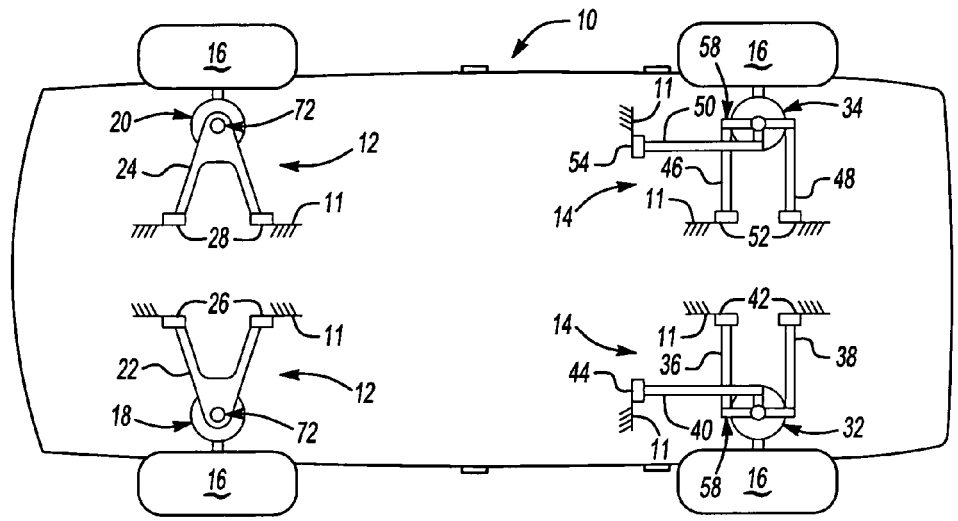
*Fig-1*
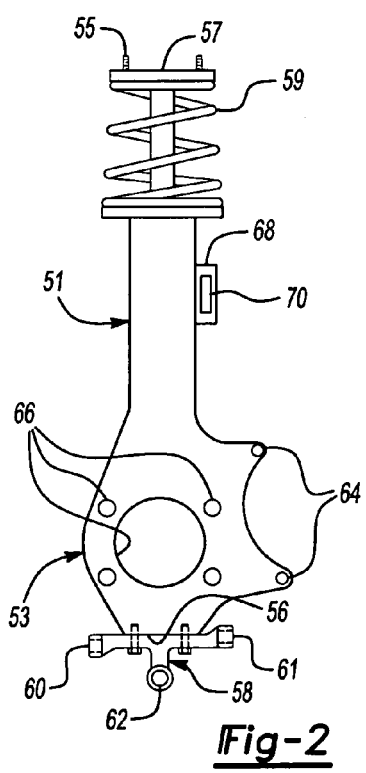
*Fig-2*
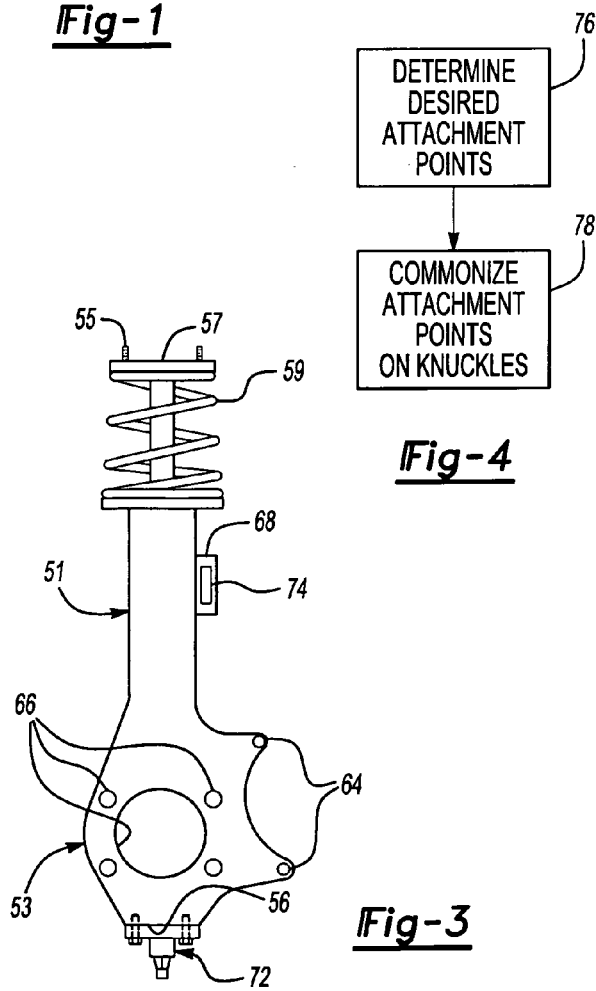
*Fig-3*
*Fig-4*

RECONFIGURABLE STRUT ASSEMBLY

This application is a Divisional of U.S. patent application Ser. No. 10/349,726 filed on Jan. 23, 2003 now U.S. Pat. No. 6,997,467.

BACKGROUND OF THE INVENTION

This invention relates to a suspension system for a passenger vehicle, and more particularly, the invention relates to a reconfigurable strut assembly including an integrated strut cylinder and knuckle for use on at least two and preferably all of the corners of a vehicle.

Vehicle suspension designs typically use an individual knuckle at each corner of a vehicle to allow for various lower suspension geometry. Specifically, the orientation and attachment of the brakes, steering components, struts relative to the vehicle body, and other features are particular to each corner of the vehicle such that a unique strut and knuckle is required at each corner of the vehicle. That is, the front and rear struts and knuckles are different, and the left and right struts and knuckles are different. Furthermore, the knuckle designs are often specific only to one vehicle line. The lack of interchangeability of struts and knuckles within a vehicle line and with other vehicles adds significant tooling costs to the suspension component. Therefore, what is needed is an interchangeable strut assembly that may be used on more than one corner of a vehicle and across vehicle lines.

SUMMARY OF THE INVENTION AND ADVANTAGES

The present invention provides a vehicle with front and rear suspension systems. The vehicle includes front left and right strut assemblies respectively including front left and right knuckles. Rear left and right strut assemblies respectively include rear left and right knuckles. The knuckles are common with one another with each knuckle having a common lower attachment boss. The front left and right knuckles respectively receive front left and right connection members at the lower attachment boss. The lower attachment boss is respectively interconnected to the front left and right suspension components. The rear left and right knuckles respectively receive rear left and right connection members at the lower attachment boss respectively interconnected to rear left and right suspension components. The overall suspension for the vehicle is designed by determining the left knuckle position parameters such as suspension member, brake, and wheel assembly attachment points. Similarly, the right knuckle position parameters are determined. Alternatively and/or additionally, front and rear knuckle portion parameters may be determined. Common vehicle attachment points on the knuckles are then calculated for the vehicle. Several iterations of the above design process may take place to commonize the suspension for a particular vehicle or across particular vehicle lines.

Accordingly, the above invention provides an interchangeable strut assembly that may be used on more than one corner of a vehicle and across vehicle lines.

BRIEF DESCRIPTION OF THE DRAWINGS

Other advantages of the present invention can be understood by reference to the following detailed description when considered in connection with the accompanying drawings wherein:

FIG. 1 is a top elevational schematic view of a front and rear suspension system for a vehicle;

FIG. 2 is a side elevational view of a common front strut assembly for the vehicle shown in FIG. 1;

FIG. 3 is a side elevational view of a rear strut assembly for the vehicle shown in FIG. 1; and FIG. 4 is a block diagram of the present invention design process for designing and manufacturing interchangeable strut assemblies for a vehicle or between vehicle lines.

DETAILED DESCRIPTION OF THE PREFERRED EMBODIMENT

The present invention provides a single integrated strut and knuckle casting that can be used on different corners of a particular vehicle and even across vehicle lines by commonizing the basic structure of the strut-knuckle and various bolt-on attachments. The attachments provide for several lower geometry configurations providing the ability of the knuckle to be used on all four corners of the vehicle as well as across vehicle lines.

A vehicle 10 is shown in FIG. 1. The vehicle 10 includes a front suspension system 12 and a rear suspension system 14. The front suspension system 12 includes front left 18 and front right 20 strut assemblies each supporting wheels 16. Although the suspension components for a particular vehicle may be different than shown, the depicted front suspension system 12 utilizes a McPherson strut geometry. The front left strut assembly 18 includes a left lower control arm 22 connected to the vehicle frame 11 by left pivotal frame connections 26, as is known in the art. Similarly, the front right strut assembly 20 includes a right lower control arm 24 pivotally connected to the vehicle frame 11 by a right pivotal frame connections 28, as is known in the art. The strut assemblies 18 and 20 are connected between the vehicle frame 11 and are attached to the lower control arms 22 and 24 typically by a ball joint, which is discussed in more detail below.

The rear suspension system 14 includes left rear 32 and right rear 34 strut assemblies. The rear suspension system 14 is of an independent trailing arm configuration. The left rear strut assembly 32 is connected to the vehicle frame 11 at the upper portion and is supported at the lower portion by a pair of spaced apart left lateral links 36 and 38. A longitudinal link 40 is connected between the lower portion of the strut assembly and the vehicle frame 11. The lateral 36, 38 and longitudinal 40 left links are pivotally supported on the vehicle frame 11 respectively by a pair of left lateral 42 and a forward 44 pivotal frame connections. Similarly, the right rear strut assembly 34 is supported by the vehicle frame 11 at an upper portion. The lower portion of the right rear strut assembly 34 is supported by a pair of spaced apart right lateral links 46 and 48. A longitudinal link 50 is interconnected between the lower portion of the strut assembly 34 and the vehicle frame 11. The right lateral links 46 and 48 and longitudinal link 50 are pivotally supported on the vehicle frame 11 respectively by a pair of right lateral 52 and a forward 54 pivotal frame connections.

The front suspension system 12 and rear suspension system 14 described above is merely illustrative of two suspension configurations to which the present invention may apply. That is, the reconfigurable strut assembly described in further detail below may be used for suspension configurations other than those described above or depicted in the figures.

A rear strut assembly is depicted in FIG. 2. The strut assembly includes an integrated strut cylinder 51 and knuckle 53. The integrated strut cylinder 51 and knuckle 53 may be manufactured of a single metal casting. The strut assembly includes an upper attachment point 57 that may include fasteners 55 for attaching the upper portion of the strut assembly to the vehicle frame 11. A spring 59 is shown arranged between the upper attachment point 57 and the cylinder 51, although an air bag may also be used. The knuckle 53 includes a lower attachment boss 56 to which a connection member 58 may be attached using fastening elements. It is most desirable that the strut cylinder 51, knuckle 53, and lower attachment boss 56 be common for both sides of the rear strut assemblies, and preferably the strut assemblies for both the front and rear of the vehicle. Alternatively, these may be interchangeable between strut assemblies on only one side. The connection member 58 may provide a plurality of attachment points 60, 61 and 62 specific to the left or right side of the rear suspension system 14. For a strut assembly common to both the front and rear suspension system, a connection member may be provided for each side of the front suspension system, as will be discussed relative to FIG. 3 below.

With continuing reference to FIG. 2, the knuckle 53 includes a brake attachment feature 64 and wheel assembly attachment feature 66 that are common to both sides of the rear suspension system and preferably all four corners of the vehicle. In this manner, the strut cylinder 51 and knuckle 53 may be oriented differently for the front and rear and left and right side of the vehicle. The attachment features 64 and 66 and lower attachment boss 56 may be generally coplanar so that they may be rotated 180° from one side to the other.

The damping characteristics of the strut assembly may be tailored for the front or rear suspension of a vehicle or between vehicle lines by providing an external valve housing 68 extending from a portion of the strut cylinder 51. Depending upon the desired damping for the application, a particular valve assembly 70 may be installed within the external valve housing 68 to provide the desired damping characteristics for the application. In this manner, the reconfigurable strut assembly may be more specifically tailored for the desired application so that the flexibility using the common design of the present invention is not sacrificed.

Referring to FIG. 3, a front suspension strut assembly is shown. A different connection member 72, such as a ball joint may be secured to the lower attachment boss 56 to provide the particular attachment feature typically used for a McPherson strut configuration. A different valve assembly 74 may be installed in the external valve housing 68 to provide a damping characteristic for the front suspension that is different than the rear suspension. Components such as the upper attachment point 57 and the spring element 59 may also be varied.

Referring to FIG. 4, the design process for the present invention reconfigurable strut assembly requires the consideration of various design features for the left and right sides and front and rear sides of a particular vehicle and potentially between or across vehicle lines. First, the desired attachment points such as brake attachment features, wheel assembly attachment features, and upper and lower attachment points must be determined, as indicated in block 76. The vehicle attachment points must then be commonized by calculating the most desirable attachment points for the strut assemblies, as shown at block 78. Several iterations of the design process depicted in FIG. 4 may be required to obtain the desired common strut assembly.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of manufacturing suspension assemblies for a desired vehicle comprising the steps of:
   a) determining first knuckle position parameters for a first knuckle integrated with a first strut cylinder;
   b) determining second knuckle position parameters for a second knuckle integrated with a second strut cylinder;
   c) calculating common vehicle attachment points on the first and second knuckles for vehicle components; and
   d) providing a valve housing on each of the first and second strut cylinders that is accessible externally of each of the first and second strut cylinders.

2. The method according to claim 1, wherein the common vehicle attachment points are suspension member attachment points.

3. A method of manufacturing suspension assemblies for a desired vehicle comprising the steps of:
   a) determining first knuckle position parameters for a first knuckle integrated with a first strut cylinder;
   b) determining second knuckle position parameters for a second knuckle integrated with a second strut cylinder; and
   c) calculating common vehicle attachment points on the first and second knuckles for vehicle components, wherein the common vehicle attachment points are brake attachment points.

4. The method according to claim 1, wherein the common vehicle attachment points are wheel assembly attachment points.

5. The method according to claim 1, wherein steps a) and b) respectively include determining left and right knuckle position parameters.

6. The method according to claim 5, wherein steps a) and b) respectively include determining left and right strut position parameters and step c) includes calculating a common upper strut attachment point.

7. A method of manufacturing suspension assemblies for a desired vehicle comprising the steps of:
   a) determining first knuckle position parameters for a first knuckle integrated with a first strut cylinder;
   b) determining second knuckle position parameters for a second knuckle integrated with a second strut cylinder, wherein steps a) and b) respectively include determining front and rear knuckle position parameters; and
   c) calculating common vehicle attachment points on the first and second knuckles for vehicle components.

8. The method according to claim 7, wherein steps a) and b) respectively include determining front and rear strut position parameters and step c) includes calculating a common upper strut attachment point.

9. The method according to claim 1, comprising the step of securing a lower control arm to each of the first and second knuckles at one of the common vehicle attachment points.

10. The method according to claim 9, comprising the step of interconnecting the first and second knuckles and the lower control arms with a ball joint at one of the common vehicle attachment points.

11. The method according to claim 9, comprising the step of securing each of the lower control arms to a vehicle frame.

12. The method according to claim 1, wherein each of the first knuckle integrated with the first strut cylinder and second knuckle integrated with the second strut cylinder provide a McPherson strut arrangement.

* * * * *